US012308517B2

(12) United States Patent
Bhattacharya et al.

(10) Patent No.: US 12,308,517 B2
(45) Date of Patent: May 20, 2025

(54) PERIODIC MODE-SELECTIVE STRUCTURE FOR SURFACE WAVE SCATTERING MITIGATION IN MILLIMETER WAVE ANTENNA ARRAYS

(71) Applicants: Swiftlink Technologies Co., Ltd., Suzhou (CN); Swiftlink Technologies Inc., Richmond (CA)

(72) Inventors: Abhijit Bhattacharya, Burnaby (CA); Robert Hill, Richmond (CA); Min-Yu Huang, Richmond (CA)

(73) Assignee: Swiftlink Technologies Inc., Richmond (CA)

( * ) Notice: Subject to any disclaimer, the term of this patent is extended or adjusted under 35 U.S.C. 154(b) by 156 days.

(21) Appl. No.: 17/669,102

(22) Filed: Feb. 10, 2022

(65) Prior Publication Data

US 2023/0253702 A1 Aug. 10, 2023

(51) Int. Cl.
*H01Q 1/52* (2006.01)
*H01Q 1/48* (2006.01)
*H01Q 21/06* (2006.01)

(52) U.S. Cl.
CPC ................. *H01Q 1/52* (2013.01); *H01Q 1/48* (2013.01); *H01Q 21/061* (2013.01)

(58) Field of Classification Search
CPC .......... H01Q 1/52; H01Q 1/48; H01Q 21/061; H01Q 15/00; H01Q 3/446; H01Q 21/26
USPC .......................................................... 343/841
See application file for complete search history.

(56) References Cited

U.S. PATENT DOCUMENTS

| | | | | |
|---|---|---|---|---|
| 5,132,698 A * | 7/1992 | Swineford | H01Q 9/38 343/846 |
| 6,040,805 A * | 3/2000 | Huynh | H01Q 13/065 343/873 |
| 6,175,337 B1 * | 1/2001 | Jasper, Jr. | H01Q 21/0043 343/770 |
| 6,262,495 B1 * | 7/2001 | Yablonovitch | H01Q 15/008 307/101 |
| 6,483,481 B1 * | 11/2002 | Sievenpiper | H01Q 15/008 343/909 |
| 7,145,518 B2 * | 12/2006 | Tanaka | H01Q 9/42 343/822 |
| 7,592,963 B2 * | 9/2009 | Cheng | H01Q 13/10 343/769 |

(Continued)

OTHER PUBLICATIONS

D. Sievenpiper, Lijun Zhang, R. F. J. Broas, N. G. Alexopolous and E. Yablonovitch, "High-impedance electromagnetic surfaces with a forbidden frequency band," in IEEE Transactions on Microwave Theory and Techniques, vol. 47, No. 11, pp. 2059-2074, Nov. 1999, doi: 10.1109/22.798001. (Year: 1999).*

(Continued)

*Primary Examiner* — Graham P Smith
(74) *Attorney, Agent, or Firm* — WOMBLE BOND DICKINSON (US) LLP

(57) ABSTRACT

According to one embodiment, an RF front end includes an antenna array that is attached to a PCB. A structure is attached to the PCB. The structure has a plurality of concentric rings to enclose an antenna array on the PCB. Each of the plurality of concentric rings has a vertical portion attached to a ground plane of the PCB through a substrate of the PCB, and a planar strip attached to the vertical portion at an end that is opposite of the ground plane.

18 Claims, 7 Drawing Sheets

(56) References Cited

U.S. PATENT DOCUMENTS

| | | | | |
|---|---|---|---|---|
| 7,728,774 | B2 * | 6/2010 | Akkermans | H01Q 21/0075 343/893 |
| 7,855,689 | B2 * | 12/2010 | Fukui | H01Q 21/068 343/846 |
| 7,928,915 | B2 * | 4/2011 | Sanz Arronte | H01Q 1/48 343/702 |
| 7,982,673 | B2 * | 7/2011 | Orton | H01Q 15/006 343/909 |
| 8,018,384 | B2 * | 9/2011 | Floyd | H01Q 21/065 343/795 |
| 8,354,975 | B2 * | 1/2013 | Ando | H01Q 15/008 343/756 |
| 8,624,788 | B2 * | 1/2014 | Ayatollahi | H01Q 1/521 343/745 |
| 8,890,761 | B2 * | 11/2014 | Toyao | H01P 5/028 343/834 |
| 9,323,877 | B2 * | 4/2016 | Ng | H01Q 1/40 |
| 9,386,688 | B2 * | 7/2016 | MacDonald | H01Q 9/0407 |
| 9,553,371 | B2 * | 1/2017 | MacDonald | H01Q 17/00 |
| 9,579,748 | B2 * | 2/2017 | Nair | B23K 26/355 |
| 9,692,132 | B2 * | 6/2017 | Kawaguchi | H01Q 1/32 |
| 9,748,663 | B2 * | 8/2017 | Wong | H01Q 19/005 |
| 9,923,277 | B2 * | 3/2018 | Baek | H01Q 15/006 |
| 10,014,572 | B2 * | 7/2018 | Tagi | H01Q 1/525 |
| 10,505,279 | B2 * | 12/2019 | Celik | H01Q 1/48 |
| 10,886,622 | B1 * | 1/2021 | Patel | H01Q 15/0066 |
| 11,350,522 | B2 * | 5/2022 | Khan | H01L 24/13 |
| 11,664,589 | B2 * | 5/2023 | Koul | H01Q 1/241 343/702 |
| 11,721,892 | B2 * | 8/2023 | Johansson | H01Q 1/521 343/700 MS |
| 11,728,570 | B2 * | 8/2023 | Marsolais | G01S 7/03 342/175 |
| 11,749,886 | B1 * | 9/2023 | Tabatabai | H01Q 21/0037 343/762 |
| 2005/0205292 | A1 * | 9/2005 | Rogers | H05K 1/0231 174/262 |
| 2009/0015499 | A1 * | 1/2009 | Kuroda | H01Q 15/14 343/700 MS |
| 2013/0113668 | A1 * | 5/2013 | Kyriazidou | H01Q 19/06 343/753 |
| 2015/0015451 | A1 * | 1/2015 | Tatarnikov | H01Q 1/48 343/848 |
| 2015/0029062 | A1 * | 1/2015 | Ng | H01Q 1/48 343/756 |
| 2016/0344093 | A1 * | 11/2016 | Tagi | H01Q 15/008 |
| 2018/0090851 | A1 * | 3/2018 | Feldman | H01Q 21/24 |
| 2018/0191073 | A1 * | 7/2018 | Celik | H01Q 5/40 |
| 2019/0198987 | A1 * | 6/2019 | Abiri | H01Q 9/0407 |
| 2020/0076072 | A1 * | 3/2020 | Keyrouz | H05K 1/0236 |
| 2020/0144714 | A1 * | 5/2020 | Noras | H01Q 1/526 |
| 2021/0359404 | A1 * | 11/2021 | Johansson | H01Q 21/065 |
| 2023/0156988 | A1 * | 5/2023 | Lin | H05K 9/0088 174/394 |
| 2023/0231317 | A1 * | 7/2023 | Miki | H01Q 21/08 343/702 |
| 2023/0247757 | A1 * | 8/2023 | Crouch | H01Q 1/38 343/841 |
| 2023/0253703 | A1 * | 8/2023 | Huang | H01Q 1/521 343/702 |

OTHER PUBLICATIONS

Zhang, Y, Cao, Y, Liu, Y. Design of an omnidirectional transmit/receive antenna pair using mushroom-like electromagnetic bandgap structure. Int J RF Microw Comput Aided Eng. 2022; 32(11):e23344. doi:10.1002/mmce.23344 (Year: 2022).*

Kildal, Per-Simon. "Artificially soft and hard surfaces in electromagnetics." IEEE Transactions on Antennas and Propagation 38, No. 10 (1990): 1537-1544.

Kunysz, Waldemar. "A three dimensional choke ring ground plane antenna." In Proceedings of the 16th international technical meeting of the satellite division of the institute of navigation (ION GPS/GNSS 2003), pp. 1883-1888. 2003.

* cited by examiner

EXAMPLE A - GROUNDPLANE

EXAMPLE B - GROUNDPLANE WITH SUBSTRATE

EXAMPLE C – GROUNDPLANE WITH WAVE SUPPRESSION STRUCTURE AND SUBSTRATE

PERIODIC MODE-SELECTIVE STRUCTURE FOR SURFACE WAVE SCATTERING MITIGATION IN MILLIMETER WAVE ANTENNA ARRAYS

FIELD OF THE INVENTION

Embodiments of the present invention relate generally to wireless communication devices. More particularly, embodiments of the invention relate to structure for surface wave scattering mitigation in millimeter wave antenna arrays.

BACKGROUND

Wireless communication systems have historically undergone a revolution every decade or so. The first wave of commercialization of 5G technology is recently underway. Widespread adaptation of 5G is anticipated by 2025. The market is demanding that 5G should support a far greater system capacity than the current 4G systems.

To address 5G design targets and expectations, one of the key approaches to achieving several orders of magnitude increase in system capacity is to exploit large quantities of currently unused bandwidth. Such an endeavor may require migrating towards higher frequencies. In particular, frequencies in the millimeter-wave ("mmWave") region may be leveraged. Utilizing mmWave frequencies may release a large amount of bandwidth, which in turn, may help 5G systems achieve a higher capacity.

The international telecommunication union (ITU) has already announced that, for 5G communications, the usable spectrum may include 24.25-27.5 GHz, 37-40.5 GHz, 66-76 GHz in millimeter wave bands. Similarly, the Federal Communications Commission (FCC) has announced the spectrum of 27.5-28.35 GHz, 37-38.6 GHz, 38.6-40 GHz, 64-71 GHz for 5G. The Ministry of Industry and Information Technology (MIIT) of the Chinese government has announced 5G bands to include 24.75-27.5 GHz and 37-42.5 GHz.

Therefore, to cater the needs of the prominent frequency bands in mmWave 5G communications globally it is desirable that the front end of a 5G terminal device supports a wide frequency bandwidth at least from 24 GHz all the way up to 43.5 GHz.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
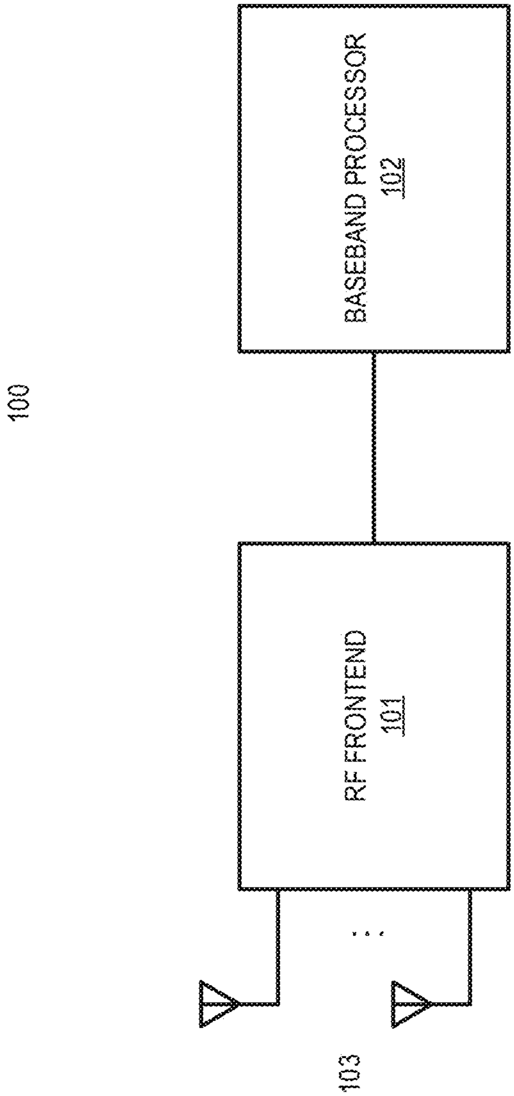
FIG. 1 is a block diagram illustrating an example of a wireless communication device, in accordance with some embodiments of the present disclosure.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" or "attached" means a direct mechanical and electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on".

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially" herein refers to being within 10% of the target.

5G is the 5th generation mobile network. It is a new global wireless standard after 1G, 2G, 3G, and 4G networks. 5G enables a new kind of network that is designed to connect more people and devices (e.g., cars, internet of things (IoT) devices, mobile devices, computers, phones, sensors, appliances, etc.).

5G wireless technology is meant to deliver higher multi-Gbps peak data speeds, ultra-low latency, improved reliability, massive network capacity, increased availability, and a more uniform experience to users.

As described, there is a need in 5G applications for a broadband communication platform. Devices that communicate over 5G may benefit from a RF front end component that supports a wide frequency bandwidth, such as, for example, from 24 GHz to 43.5 GHz, or broader.

Such a broadband functionality presents problems for device antenna design. The antenna may be thought of as the central component of a wireless communication system. The antenna serves as the communication interface between a device and the wireless communication medium or the wireless channel that the device communicates through. For an antenna to cover a wide operating bandwidth, present-day antennas generally require larger electrical volume. Thus, it is desirable to make an antenna with a compact footprint. In particular, for a planar antenna fabricated using conventional printed circuit board (PCB) technologies, a broadband antenna may be supported on thicker substrate, which may be a dielectric material. Such a broadband antenna may encounter further issues.

For example, surface waves excited within the thick dielectric substrate material can be detrimental to antenna's radiation performance. Electromagnetic surface waves that may be generated from the antenna may become trapped in the substrate and ground plane structure. These surface waves may propagate within the dielectric material of the printed circuit board of the antenna or the array elements, and do not contribute to direct radiation. When the surface waves reach the edges and corners of the printed circuit board, they scatter in all directions. The scattering from surface waves may then interfere with direct radiation from the antenna or array elements resulting in severe ripples in radiation pattern of the elements and degradation of array performance. Surface wave scattering from the device edges result in an increase in undesired back radiation, which can cause interference issues with other electronics on the same platform.

As such, there is a desire to mitigate the surface waves of an antenna system (e.g., an RF front end of a device). A surface wave mitigation structure may reduce this detrimental effect of scattering interference.

In some embodiments, a surface wave mitigation structure disclosed herein may include broadband or multi-band frequency selective structures arranged concentrically around the array elements to stop the surface waves, thus reducing surface wave scattering from the platform edges and corners. The structure is found to improve embedded radiation patterns of the individual elements as well as the array patterns in a phased array antenna system. Therefore, such a structure be integrated with new generation of wireless communication antenna systems to provide broadband functionality.

According to a first aspect, a structure which reduces surface wave propagation on a printed circuit board (PCB) may include a plurality of concentric metallic rings to enclose an antenna array on the PCB. Each of the plurality of concentric rings including a vertical portion attached to a ground plane of the PCB through a substrate of the PCB, and a planar strip attached to the vertical portion at an end that is opposite of the ground plane.

In some embodiments, the planar strip is arranged in a layer of the PCB above the ground plane. A PCB may be fabricated with a plurality of layers. The ground plane may occupy a base layer, and the planar strip may be laid in a substrate of the PCB at a layer above the base layer.

In some embodiments, the structure includes at least one of: silver, nickel, copper, gold, or a combination thereof.

In some embodiments, the vertical portion and the planar strip are continuous throughout each respective concentric ring. For example, the trace of the planar strip may have a continuous path along a length of the concentric ring without interruption, to block surface wave propagation from the antenna.

In some embodiments, a gap is present between each pair of planar strips of the plurality of concentric rings that are adjacent to each other. In some embodiments, each gap or a small fraction of the wavelength of operation, is less than or equal to 0.5 millimeters.

In some embodiments, the planar strip of each of the plurality of concentric rings is attached to the vertical portion at an edge of the planar strip which creates an upside down 'L' shape.

In some embodiments, the planar strip of each of the plurality of concentric rings is centered on the vertical portion of the respective concentric ring which creates a 'T' shape.

In some embodiments, the planar strip of each of the plurality of concentric rings is off-centered on the vertical portion. In other embodiments, a first planar strip is centered on a first vertical portion of a first of the plurality of concentric rings and a second planar strip is off-centered on a second vertical portion of a second of the plurality of concentric rings.

In some embodiments, a first planar strip of a first of the plurality of concentric rings has a first width, and a second planar strip of a second of the plurality of concentric rings has a second width that is different from the first width. Thus, the concentric rings may have mixed width to provide a particular frequency response.

In some embodiments, the planar strip of each of the plurality of concentric rings is parallel with the ground plane. For example, each of the ground plane and the planar strips may be laid flat in parallel layers of a PCB.

In some embodiments, the structure includes at least three concentric rings. In some embodiments, the structure includes at least six. The number of concentric rings may depend on the size of the PCB as well as the amount of improvement required in electrical performance.

In some embodiments, each of the plurality of concentric rings has a rectangular shape. For example, each planar strip may trace around the antenna in a rectangular path (e.g., with four sides). In other embodiments, each of the plurality of concentric rings has a circular shape.

In some embodiments, the antenna array includes an array of transmitting (TX) antenna elements. Additionally, or alternatively, in some embodiments, the antenna array includes an array of receiving (RX) antenna elements.

In some embodiments, variation of one or more parameters such as: a gap width between the planar strips of the plurality of concentric rings that are adjacent to each other; a height of the vertical portion of each of the plurality of concentric rings; and a width of the planar strip of one or more of the plurality of concentric rings results in a change to a frequency or strength at which the structure reduces the surface wave propagation on the PCB. These parameters may be varied to reduce surface waves and target specific modes or frequency bands of the surface waves.

According to a second aspect, a radio frequency (RF) frontend circuit includes a printed circuit board (PCB), an antenna array attached to the PCB, and a structure attached to the PCB. The structure includes a plurality of concentric rings to enclose an antenna array on the PCB. Each of the plurality of concentric rings includes a vertical portion attached to a ground plane of the PCB through a substrate of the PCB, and a planar strip attached to the vertical portion at an end that is opposite of the ground plane.

According to a third aspect, an electronic device includes a printed circuit board (PCB), an antenna array attached to the PCB, and a structure attached to the PCB. The structure includes a plurality of concentric rings to enclose an antenna array on the PCB. Each of the plurality of concentric rings includes a vertical portion attached to a ground plane of the PCB through a substrate of the PCB, and a planar strip attached to the vertical portion at an end that is opposite of the ground plane.

FIG. 1 is a block diagram illustrating an example of a wireless communication device according one embodiment of the invention. Referring to FIG. 1, wireless communication device 100, also simply referred to as a wireless device or device, includes, amongst other components, an RF frontend module 101 and a baseband processor 102. Wireless device 100 can be any kind of wireless communication devices such as, for example, mobile phones, laptops, tablets, hotspots, CPEs (customer premises equipment), base station units, network appliance devices (e.g., Internet of thing or IOT appliance devices), etc.

In a radio receiver circuit, the RF frontend 101 may include all the circuitry between the antenna up to and including the mixer stage. It may include all the components in the receiver that process the signal at the original incoming radio frequency, before it is converted to a lower intermediate frequency (IF). Base band processor 102 may be a device (a chip or part of a chip) in a network interface that manages all the radio functions (all functions that require an antenna).

RF Front end 101 may include an antenna array 103 (e.g., an RX antenna array, a TX antenna array, or both) that is attached to a substrate of a PCB. A PCB substrate may refer to the physical material that holds the traces and components. Such material may be an insulating material (e.g., a dielectric material). The RF front end 101 may include a surface wave mitigation structure with concentric rings that enclose the antenna array 103, as described in other sections.

Figure 2:
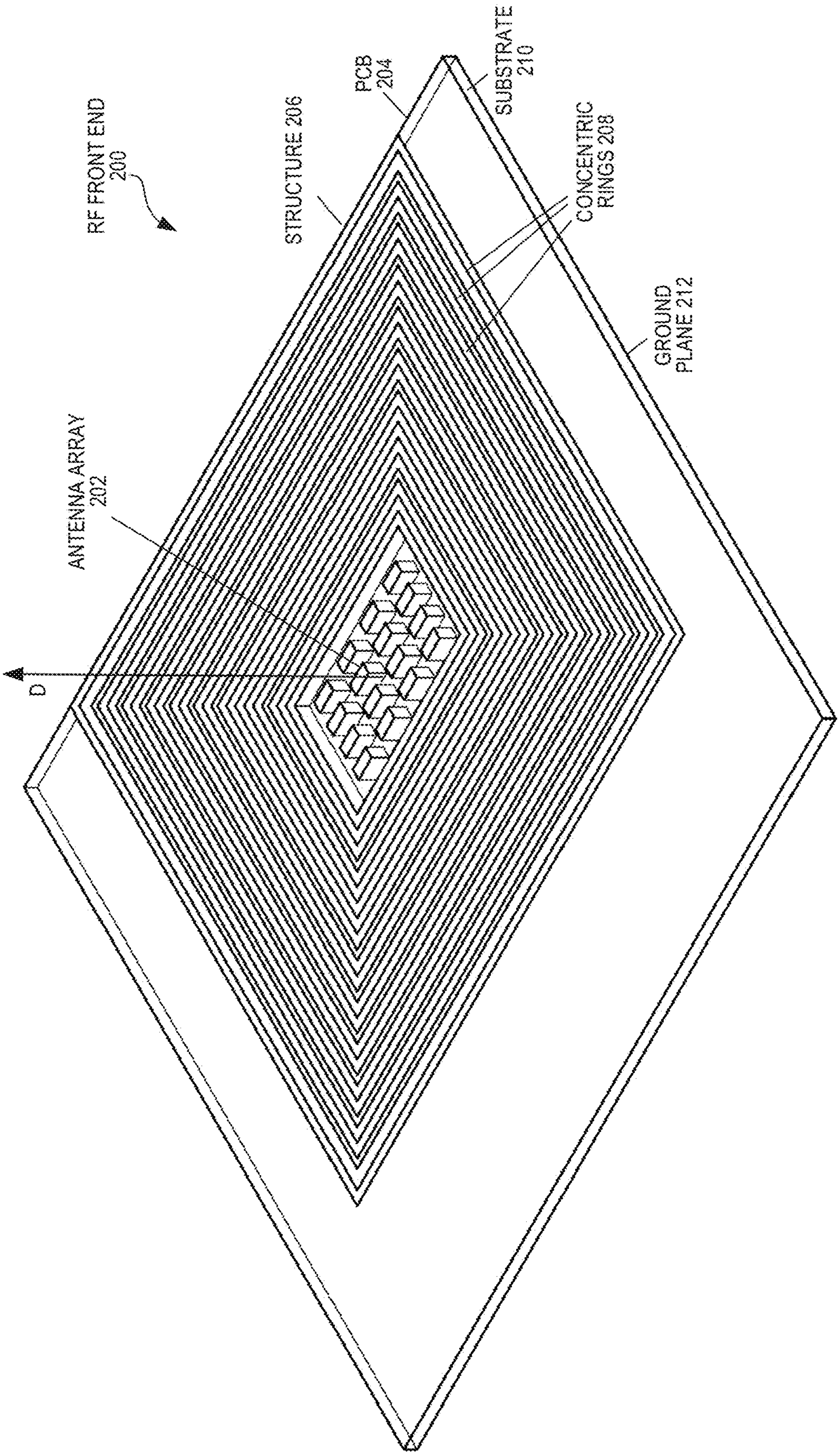
FIG. 2 shows an example of an RF front end with a surface wave mitigation structure, in accordance with some embodiments.

FIG. 2 shows an example of an RF front end 200 with a surface wave mitigation structure, in accordance with some embodiments. The RF front end 200 may include a PCB 204 and components attached to a PCB 204.

The PCB may be formed from a substrate 210, which as discussed, may be an insulating material such as epoxy, fiberglass, a polymer, or other insulating material. The substrate 210 may provide structure and stiffness that holds vias, traces, ground planes, and other components or elements that are attached to or embedded within the PCB.

The PCB may include a ground plane 212 which may be planar in shape. A planar shape or surface may be understood as a substantially flat and straight shape, e.g., a plane surface. The ground plane 212 may occupy a layer within the PCB 204. The ground plane 212 may be unbroken. For example, the ground plane 212 may occupy the entire layer of the PCB without interruption. The ground plane 212 may include a suitably conductive material, for example, a metal such as silver, nickel, copper, gold, or a combination thereof.

An antenna array 202 which may include wide-band mmWave phased array elements, may be attached and supported on the substrate 210 of the PCB. The antenna array may include a TX antenna array (having TX array elements), an RX antenna array (having RX array elements), or a combination thereof. An antenna array may be understood as a set of multiple antennas which are connected and work together to operate as a single antenna to transmit or receive radio waves. Various antenna array technologies may be implemented without departing from the scope of the present disclosure.

A surface wave mitigation structure 206 is arranged on the PCB in concentric rings 208 that encircle the antenna array 202. The structure 206 serves to mitigate surface waves in the ground plane and substrate of the PCB. As a result of the reduced surface waves, surface wave scattering, and overall interference to the antenna is reduced. Less energy is wasted in back radiation, while more power is focused towards the desired forward direction (e.g., in direction D), which increases antenna directivity.

Further, the surface wave mitigation structure 206 serves to reduce surface waves for any polarization of the antenna. Further, the structure 206 may have planar strips shaped as concentric rings, which may be implemented using conventional PCB fabrication technology. Details of such concentric rings are shown in other figures such as FIG. 3, FIG. 5, FIG. 6, FIG. 7, FIG. 8, and FIG. 9, according to some embodiments.

The structure 206, which reduces surface wave propagation on a printed circuit board (PCB), may include a plurality of concentric rings 208 to enclose an antenna array 202 on the PCB 200. Each of the plurality of concentric rings include a vertical portion attached to a ground plane 212 of the PCB through a substrate 210 of the PCB, and a planar strip attached to the vertical portion at an end that is opposite of the ground plane.

The concentric rings (e.g., the vertical portion or the planar strip of each ring) may be formed from a suitably conductive material such as, for example, silver, nickel, copper, gold, or a combination thereof. Other metals may be used as well.

The planar strip may be continuous throughout each respective concentric ring. For example, they may be uninterrupted and uniform in width throughout the length of the ring. Each concentric ring may close upon itself to form a closed ring structure. The length of the ring may be understood as the length of the path that the ring takes to encircle the antenna array. The vertical portion may have spaces or gaps throughout the length of each strip that the substrate occupies. Each concentric ring, counting from the center of the rings (e.g., where the antenna array is located) may have a longer path than the last concentric ring.

The number of concentric rings in the structure 206 may vary depending on application, strength of the antenna, or frequencies that are to be targeted. In some examples, structure 206 includes at least three concentric rings. In some examples, the structure 206 includes at least 6 concentric rings. An increased number of concentric rings may reduce the surface wave propagation, however, it may also increase the footprint of the RF front end and PCB. As such, the number of concentric rings may be determined based on test and experimentation, to find an optimal number that sufficiently reduces the surface wave propagation, and is sufficiently compact and suitable for a given application.

As shown in FIG. 2, each of the plurality of concentric rings may have a rectangular shape. This shape, however, may also vary without departing from the scope of the current disclosure. For example, in some examples, each of the rings may have a circular shape, an oval shape, a triangular shape, a rectangular shape with rounded corners, or other shape with side or sides closed on itself to fully enclose the antenna array 202 on the PCB.

Figure 3:
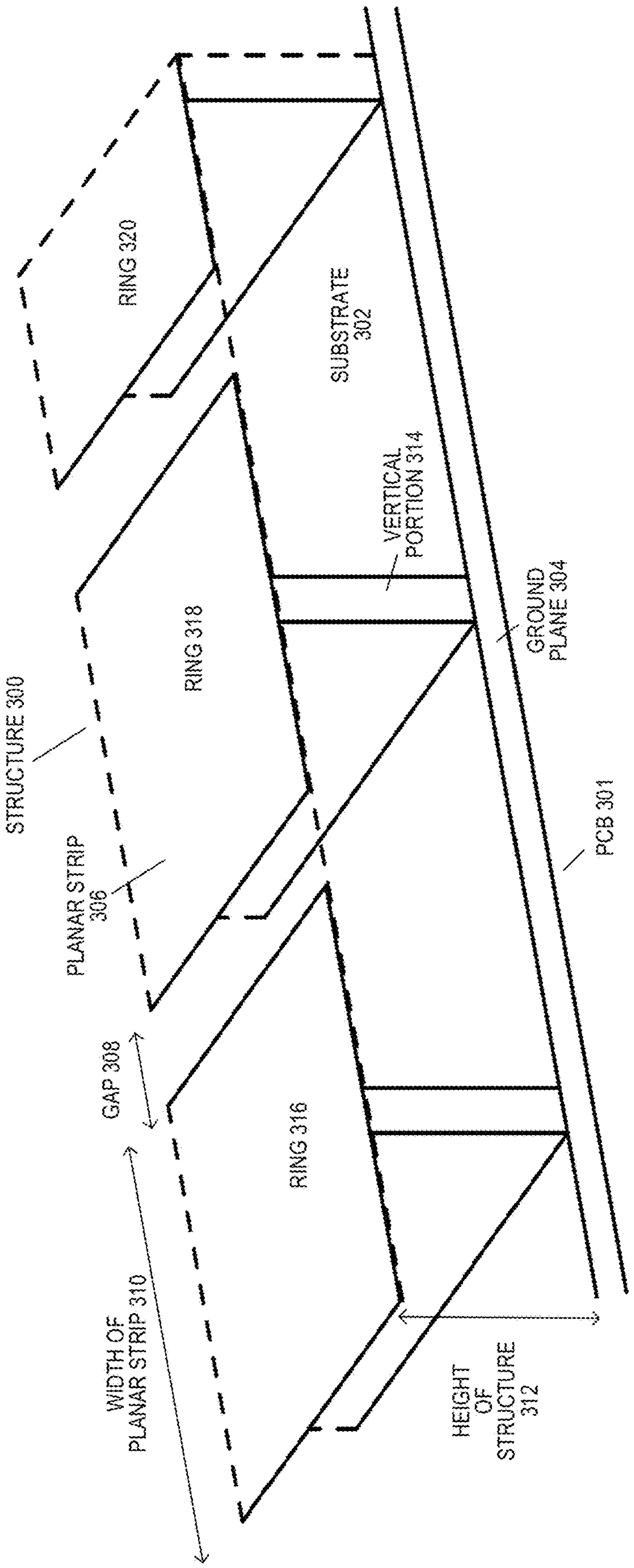
FIG. 3 illustrates an example of a surface wave mitigation structure of an RF front end, according to some embodiments.

FIG. 3 illustrates an example of a surface wave mitigation structure 300 of an RF front end, according to some aspects. This may be seen as a cross-sectional view of an RF front end such as that shown in FIG. 2.

A structure 300 may include a plurality of concentric rings such as rings 316, 318, and 320. It should be understood that the number of concentric rings may vary, as described. Thus, not all of the concentric rings of structure 300 may be shown in this example. The concentric rings of structure 300 may enclose an antenna array (not shown) which attaches to the PCB 301.

Each of the plurality of concentric rings may include a vertical portion 314 attached to a ground plane 304 of the PCB. The vertical portions may pass through a substrate 302 of the PCB. For example, the vertical portion may be formed from a conductive material that passes through a 'via' in the substrate 302. A planar strip 306 is attached to each vertical portion 314 at an end of the vertical portion that is opposite of the ground plane. In other words, the planar strip 306 and the ground plane 304 are on opposite ends of the vertical portion 314 of each respective ring, as shown.

The planar strip 306 may be parallel to the ground plane 304. As such, the E field between the ground plane 304 and the planar strip 306 sees an open circuit condition, or high impedance at the gaps.

A gap 308 may be present between each pair of planar strips of the plurality of concentric rings that are adjacent to each other. For example, gap 308 is shown between ring 316 and ring 318, which are adjacent to each other. The gap may be understood as an absence of the planar strip or other conductive material. The gap may be occupied by the substrate 302 or nothing at all. Further, it should be understood that the space between the vertical portions adjacent structures are also occupied by substrate 302.

In some embodiments, the combined length of the height of the vertical portion and half the width of the planar strips may be a quarter of the wavelength at the operating frequency in the supporting dielectric substrate. In some embodiments, each gap 308 is 0.5 millimeters or less. In some embodiments, the height of structure 312 is between 0.5 mm and 1.5 mm. In some embodiments, the height of structure 312 is 1 mm or less. As such, compared to structures that may not have a planar strip, the size of structure 300 or its profile (e.g., its height) may be greatly reduced. In some embodiments, width 310 of the planar strips may be 5 mm or less. In some embodiments, the width 310 may be 3 mm or less. The width 310 of each planar strip is greater than a width of the vertical portion 314 on which it is attached to. In some aspects, the width is at least 2 times greater or at least 3 times greater than the width of the vertical portion.

Figure 10:
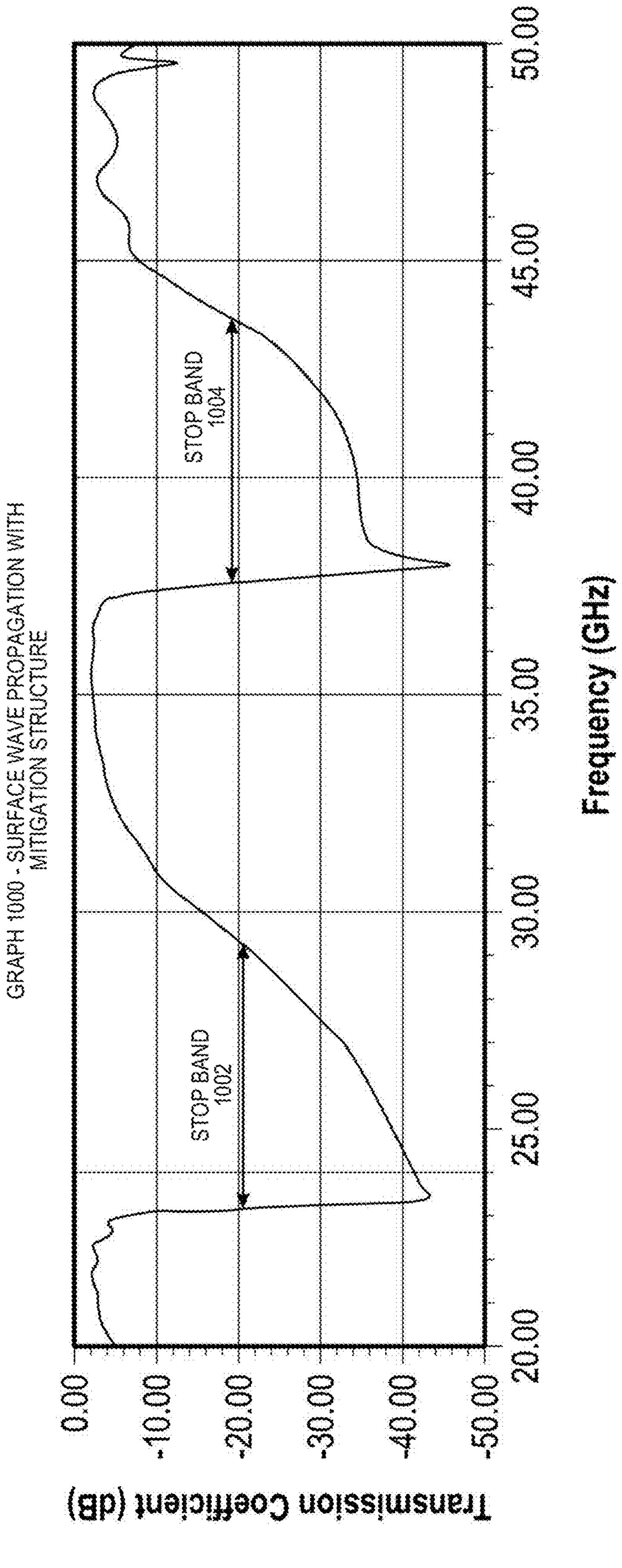
FIG. 10 shows a graph that indicates surface wave propagation stop bands with an RF front end, according to some embodiments.

The dimensions of the structure can be tuned to target one or more frequency bands or modes. For example, variation of one or more of: a gap width 308 between the planar strips of the plurality of concentric rings that are adjacent to each other, a height 312 of the structure of each of the plurality of concentric rings, or a width 310 of the planar strips of the plurality of concentric rings may result in a change to a frequency or strength at which the structure reduces the surface wave propagation on the PCB. For example, as shown in FIG. 10, the stop bands reduce propagation at some frequencies. The dimensions of the structure may be adjusted to move the stop bands to target specific frequency bands and to sufficiently reduce the surface wave propagation. The performance of the structure may also be considered in light of the overall size of the PCB and the RF front end. Optimal dimensions may be determined that are sufficient in size and in performance, through routine test and experimentation.

Figure 4:
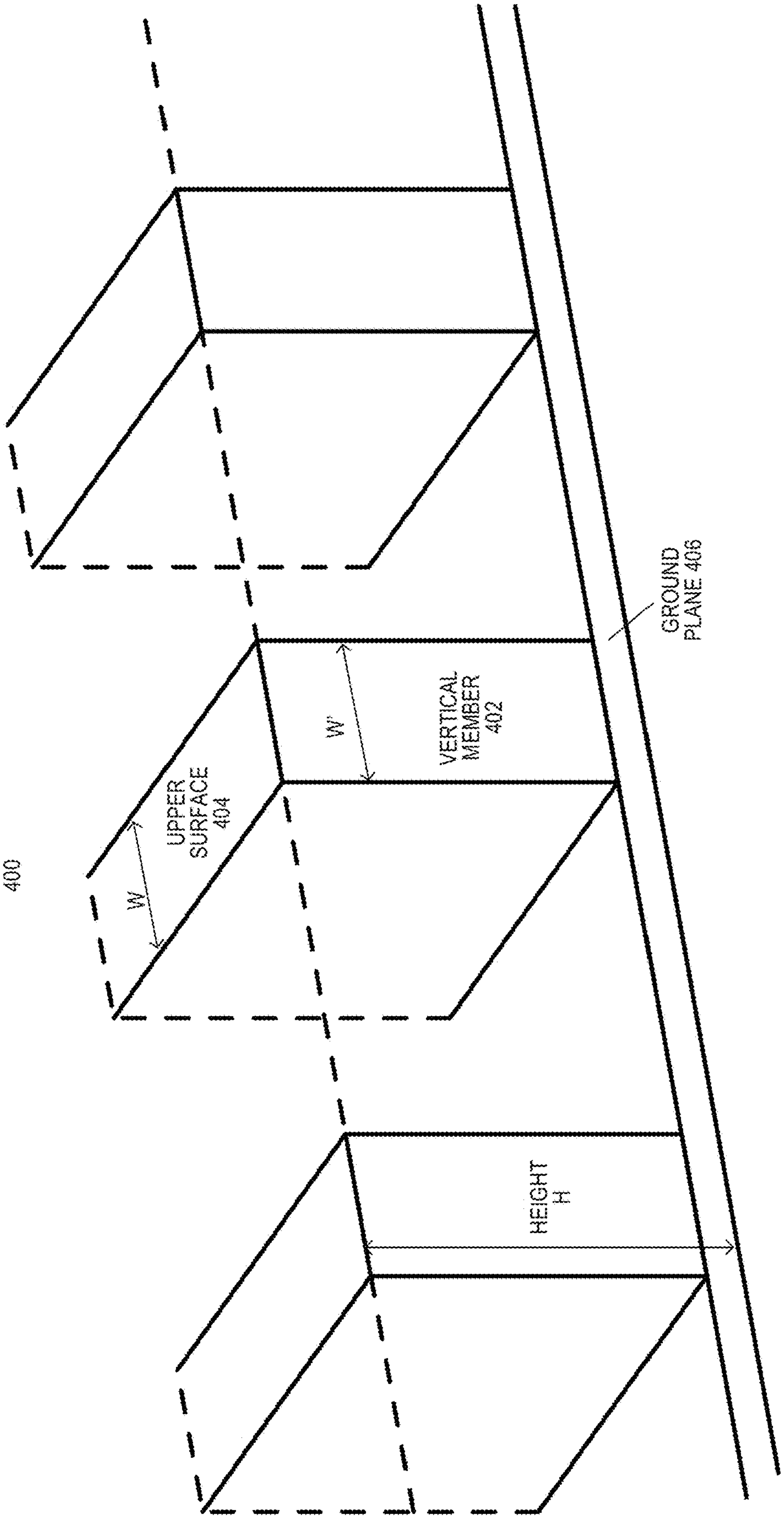
FIG. 4 is an example of a conventional surface wave mitigation structure without planar strips.

FIG. 4 is an example of a conventional surface wave mitigation structure without planar strips. Such a structure 400 may conventionally be implemented with an antenna ground plane 406 that has metallic corrugations that form vertical members 402. Due to the mode of operation of such a structure, the structure may be bulky in size. Further, such a structure may be difficult to fabricate using conventional planar PCB fabrication technologies with available standard substrate thicknesses.

Electromagnetic energy may be transmitted in waves and may propagate in all directions. The energy may radiate in concentric shells (e.g., away from the source of radiation) corresponding to amplitude. The energy may also be direction, or at least partially directional. For example, energy may radiate with a greater directionality in some directions, while being more spread or concentric in other directions.

Under waveguide theory, an electromagnetic wave can propagate with a number of formats within a waveguide, which may be represented as a structure. These different types of waves correspond to the different elements or different modes within an electromagnetic wave.

TE mode may be understood as a waveguide mode that is dependent upon the transverse electric waves, which may also be referred to as H waves. TE may be characterized by the electric vector (E) being naturally perpendicular to the direction of propagation of the electromagnetic waves.

TM mode, or transverse magnetic waves, may also be referred to as E waves. TM may be characterized by the magnetic vector (H vector) being naturally perpendicular to the direction of propagation of the electromagnetic waves.

Under structure 400, each vertical member may have an upper surface 404 that is opposite of a ground plane 406. The upper surface 404, however, has the same or similar width Was the width W' of the vertical member 402. Such a structure has a reduced surface 404 for shorting the E field. As such, the modes or frequencies that the structure into mitigate against relies on a height of each vertical member, which results in a relatively large height 'H'. For example, in order for such a structure to be effective against a broad range of frequencies, such a structure may have a height H of 2.5 mm or more, which may not be compatible with PCB fabricating technologies. In other words, the height of such a structure is frequency dependent. For example, at 30 GHz, the structure 400 may have a height that is around 2.5 mm, which is simply too thick for PCB fabrication.

In contrast, a structure such as 300, 500, 600, 700, 800, or 900 has concentric rings formed from planar metal strips and a vertical portion (e.g., a via) and may reduce the height to 1 mm or less the PCB. This structure stops both the TE- and TM-type surface wave modes from propagating along its surface (therefore, acts as high impedance surface for both TE- and TM-type surface waves) by providing two wide contiguous frequency band-gaps for the surface waves. The planar metal strips of these structures have sufficient area to short out the E-field tangential to the metal strip surface to mitigate TE to z surface wave components. The H field finds an open circuit at the gaps between the strips, and thereby TM (to z) surface wave component is blocked and cannot propagate.

As such, although a conventional structure 400 may reduce propagation of surface waves, such a structure has its drawbacks such as a large form factor, less flexibility when targeting certain frequency bands and modes, and less compatibility with PCB fabrication technologies.

In contrast, the structure 300, 500, 600, 700, 800, or 900 may have a more compact form. The height of the vertical portion or structure may be 1 mm or less. The dimensions of the concentric rings (e.g., the vertical portion and the planar strip) and the gap between the adjacent planar strips, may be configured to target certain modes or frequencies while maintaining a compact form (e.g., 1 mm or less height).

It should be understood that, without any surface mitigation structure, an antenna on a ground plane may exhibit large surface waves. On a plain metallic ground, TE (to z) modes will be shorted out, and only TM (to z) surface wave modes will be supported. Given the right thickness of the substrate, however, both TE and TM surface wave modes will exist within a substrate coated ground (similar to a printed circuit board ground) if excited, e.g., by an antenna array. These surface waves will scatter and degrade radiation performance of the antennas on the printed circuit board when they reach the edges of the printed circuit board. Thus, some form of surface wave reduction is highly beneficial.

Figure 5:
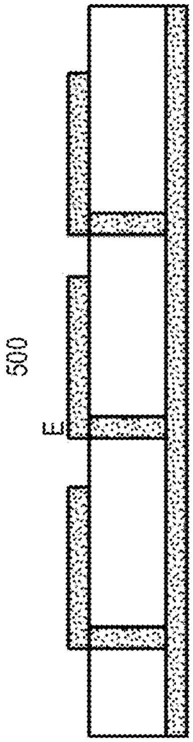
FIG. 5 illustrates an example of a surface wave mitigation structure of an RF front end with edge-connected planar strips, according to some embodiments.

FIG. 5 illustrates an example of a surface wave mitigation structure of an RF front end with edge-connected planar strips, according to some aspects. A cross-sectional view is shown of structure 500. As described in other sections, the structure includes a plurality of concentric rings that have a vertical portion that attaches at a first side to a ground plane. A planar strip is attached to the vertical portion a second side of the vertical potion opposite of the ground plane.

Under this example, for structure 500, the planar strip of each of the plurality of concentric rings is attached to the vertical portion at an edge E of the planar strip, resulting in the upside-down 'L' shape shown. In some aspects, some of the concentric rings may have the vertical portion connected at the edge of the planar strip, while others of the concentric rings may be centered or off-center relative to the vertical portion. Further, in this and other examples, the number of concentric rings may vary, and are shown with three for the purpose of illustration.

Figure 6:
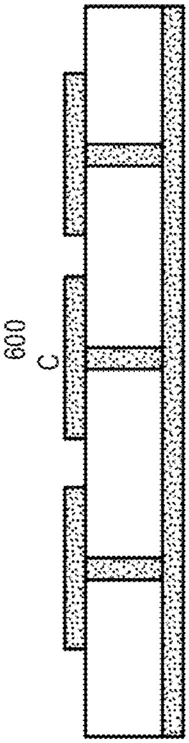
FIG. 6 illustrates an example of a surface wave mitigation structure of an RF front end with centered planar strips, according to some embodiments.

FIG. 6 illustrates an example of a surface wave mitigation structure of an RF front end with centered planar strips, according to some aspects. A cross-sectional view is shown of structure 600. As described in other sections, the structure includes a plurality of concentric rings that have a vertical portion that attaches at a first side to a ground plane. A planar strip is attached to the vertical portion a second side of the vertical potion opposite of the ground plane.

Under this example, for structure 600, the planar strip of each of the plurality of concentric rings is centered on the vertical portion, resulting in a 'T' shape. The planar strip is said to be centered on the vertical portion if the vertical portion is attached to the planar strip at a center C of the planar strip.

Figure 7:
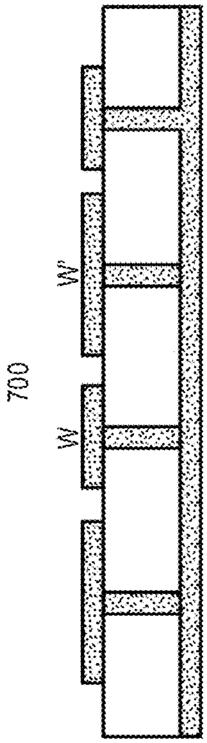
FIG. 7 illustrates an example of a surface wave mitigation structure of an RF front end with varying planar strip widths, according to some embodiments.

FIG. 7 illustrates an example of a surface wave mitigation structure of an RF front end with varying planar strip widths, according to some aspects. A cross-sectional view is shown of structure 700. As described in other sections, the structure includes a plurality of concentric rings that have a vertical portion that attaches at a first side to a ground plane. A planar strip is attached to the vertical portion a second side of the vertical potion opposite of the ground plane.

Under this example, for structure 700, a first planar strip of a first of the plurality of concentric rings has a first width W, and a second planar strip of a second of the plurality of concentric rings has a second width W' that is different from the first width. For example, W may be smaller than W'. In some embodiments, the concentric rings may have a third concentric ring with width W" that is larger or smaller than W and W'.

In some embodiments, the widths of the concentric rings may alternate. For example, a first ring from the center may have a width W. A second ring from the center may have a width W'. A third ring from the center may have a width W. A fourth ring from the center may have a width W', and so on.

Figure 8:
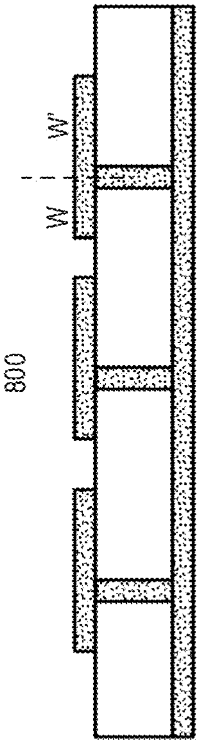
FIG. 8 illustrates an example of a surface wave mitigation structure of an RF front end with off-center planar strips, according to some embodiments.

FIG. 8 illustrates an example of a surface wave mitigation structure of an RF front end with off-center planar strips, according to some aspects. A cross-sectional view is shown of structure 800. As described in other sections, the structure includes a plurality of concentric rings that have a vertical portion that attaches at a first side to a ground plane. A planar strip is attached to the vertical portion a second side of the vertical potion opposite of the ground plane.

Under this example, for structure 800, the planar strip of each of the plurality of concentric rings is off-centered on the vertical portion. In such an embodiment, the width W of the planar strip at a first side of the planar strip relative to the vertical portion is smaller or larger than the width W' of the planar strip at a second side of the planar strip relative to the vertical portion.

Figure 9:
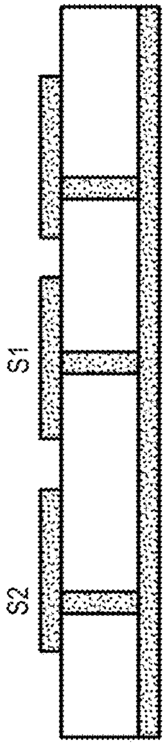
FIG. 9 illustrates an example of a surface wave mitigation structure of an RF front end with a mix of centered and off-center planar strips, according to some embodiments.

FIG. 9 illustrates an example of a surface wave mitigation structure of an RF front end with a mix of centered and off-center planar strips, according to some aspects. A cross-sectional view is shown of structure 900. As described in other sections, the structure includes a plurality of concentric rings that have a vertical portion that attaches at a first side to a ground plane. A planar strip is attached to the vertical portion a second side of the vertical potion opposite of the ground plane.

Under this example, for structure 900, a first planar strip S1 is centered on a first vertical portion of a first of the plurality of concentric rings and a second planar strip S2 is off-centered on a second vertical portion of a second of the plurality of concentric rings. The centered and off-centered strips may be alternate as they progress from the center, away from the antenna array.

Further, it should be understood that variations may be combined. For example, the centered and off-centered concentric rings may also have varying lengths. Further, widths of gaps between adjacent planar strips may vary (e.g., in an alternating manner). Other combinations of variations may be implemented.

FIG. 10 shows a graph 1000 that indicates surface wave propagation with an RF front end, according to some embodiments described in the present disclosure. The graph shows a transmission coefficient of an antenna having a surface wave mitigating structure (e.g., structure 200, 300, 500, 600, 700, 800, or 900) at different frequencies. The graph 1000 shows frequency band-gap performance in two contiguous and wide stop bands 1002 and 1004. The position of these stop bands 1002 and 1004 can be adjusted by changing the planar strip width (310) and/or gap width (308), while the period may be kept small relative to half-wavelength at the frequencies of interest.

The graph indicates that such a structure may advantageously have a very low profile (e.g., height of the structure is small compared to wavelength in the dielectric) while sufficiently reducing unwanted surface waves at targeted frequencies. Further, the structure can be readily produced with off-the-shelf microwave substrate materials that have a standard thickness. Since the planar strips of the structure effectively extends the corrugations in the lateral direction (across the planar surface rather than height-wise), less of the rings (and via) will be used to realize this structure, compared to a conventional choke ring structure (e.g., as shown in FIG. 4) to cover the same area of the circuit board ground.

Figure 11:
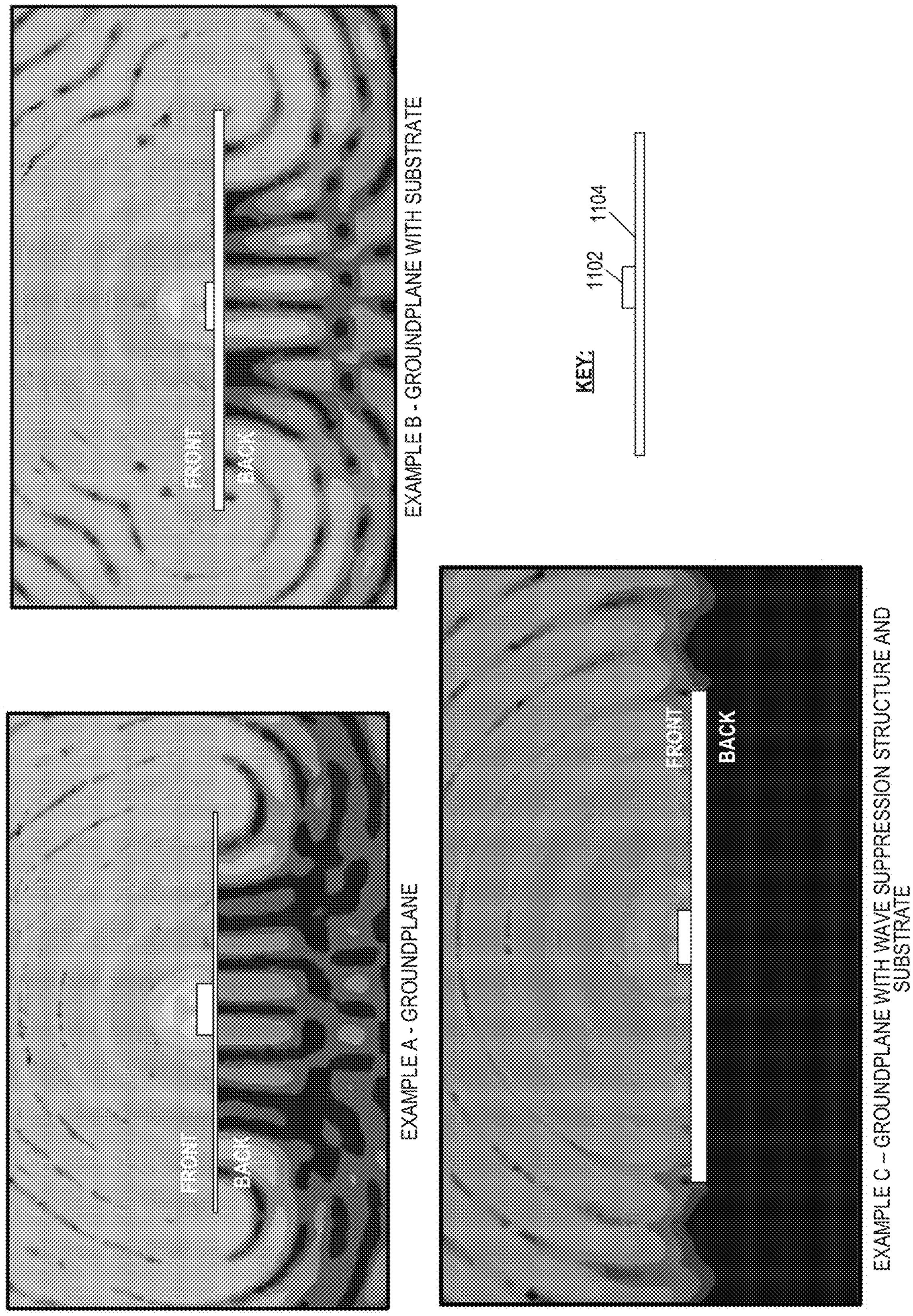
FIG. 11 illustrates radiation and scattering of energy resulting from surface waves under various configurations including an RF front end, in accordance with some embodiments.

FIG. 11 illustrates radiation and scattering of energy resulting from surface waves under various configurations including an RF front end in accordance with some embodiments.

Example A shows radiation and scattering with an antenna 1102 over a ground plane structure 1104. In Example A, the ground plane structure is bare, without a surface mitigation structure, and without a substrate material.

Example B shows radiation and scattering with an antenna 1102 over a ground plane structure 1104, but here, the ground plane structure has a dielectric coating to mimic behavior of a substrate (e.g., in a PCB configuration).

Example C shows radiation and scattering with an antenna 1102 over a ground plane structure 1104 that includes a surface wave mitigation structure such as those described in other sections (e.g., 200, 300, 500, 600, 700, 800, 900).

In Example A and Example B, surface waves are clearly shown to reach the end of edges of the ground plane. From there, the waves scatter towards the front and back of the assembly. In contrast, Example C shows that the disclosed structure may eliminate the propagation of surface waves along the circuit board ground. The direct radiation from the antenna element into the space above the antenna is present in all examples, as is some scattering coming from the direct space waves hitting the ground edges.

Examples A and Example B show ripples in all directions that severely affect the usable beam width of the antenna element. Back radiation is also shown to be strong in Example A and B, resulting in loss of energy and potential interference issues.

On the other hand, with Example C (the ground plane covered with the disclosed surface wave mitigation structure), a significant improvement in the ripples in the radiation patterns is shown. Back radiation in Example C is largely reduced. Additionally, the radiated energy towards the front is cleaner (less ripple and less interference from scattered waves) and more concentrated, with less distortion. As a result, Example C shows an antenna operation with reduced interference and losses (e.g., in substrate, in back radiation), which improves the antenna's directive gain.

Therefore, testing with Example A, Example B, and Example C show the effectiveness in such a structure for reducing surface wave propagation. Such a structure provides a vast improvement over a bare ground plane, and one with a layer of dielectric material which simulates a PCB substrate.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A structure which reduces surface wave propagation on a printed circuit board (PCB), the structure comprising:

a plurality of concentric rings to enclose an antenna array that is associated with an operating frequency and is fixed on the PCB, each of the plurality of concentric rings including a vertical portion that runs continuously along each of the plurality of concentric rings and that is attached to a ground plane of the PCB through a substrate of the PCB, and a planar strip attached to the vertical portion at an end that is opposite of the ground plane, wherein a height of the vertical portion and half a width of the planar strip have a combined length that is a quarter of a wavelength of the operating frequency that is associated with the antenna array, and wherein a first of the plurality of concentric rings comprises a first planar strip that is centered on a first vertical portion of the first of the plurality of concentric rings and a second of the plurality of concentric rings comprises a second planar strip that is off-centered on a second vertical portion of the second of the plurality of concentric rings, and wherein the plurality of concentric rings alternate between being centered and being off-centered as the plurality of concentric rings progress away from the antenna array.

2. The structure of claim 1, wherein the planar strip is arranged in a layer of the PCB above the ground plane.

3. The structure of claim 1, wherein the structure comprises at least one of: copper, silver, gold, or a combination thereof.

4. The structure of claim 1, wherein the planar strip is continuous throughout each respective concentric ring.

5. The structure of claim 1, wherein a gap is present between each pair of planar strips of the plurality of concentric rings that are adjacent to each other.

6. The structure of claim 5, wherein each of said gap is less than or equal to 0.5 millimeters.

7. The structure of claim 1, wherein at least one planar strip of the plurality of concentric rings is attached to the vertical portion at an edge of the planar strip.

8. The structure of claim 1, wherein a first planar strip is centered on a first vertical portion of a first of the plurality of concentric rings and a second planar strip is off-centered on a second vertical portion of a second of the plurality of concentric rings.

9. The structure of claim 1, wherein a first planar strip of a first of the plurality of concentric rings has a first width, and a second planar strip of a second of the plurality of concentric rings has a second width that is different from the first width.

10. The structure of claim 1, wherein the planar strip of each of the plurality of concentric rings is parallel with the ground plane.

11. The structure of claim 1, wherein the structure includes at least three concentric rings.

12. The structure of claim 1, wherein each of the plurality of concentric rings has a rectangular shape.

13. The structure of claim 1, wherein each of the plurality of concentric rings is unbroken and arranged around the antenna array to fully enclose the antenna array on the PCB.

14. The structure of claim 1, wherein the antenna array includes an array of TX antenna elements.

15. The structure of claim 1, wherein the antenna array includes an array of RX antenna elements.

16. The structure of claim 1, wherein variation of one or more of: a gap width between the planar strips of the plurality of concentric rings that are adjacent to each other; a height of the vertical portion of each of the plurality of concentric rings; and a width of the planar strip of one or more of the plurality of concentric rings results in a change to a frequency or strength at which the structure reduces the surface wave propagation on the PCB.

17. A front end radio frequency (RF) circuit, comprising:

a printed circuit board (PCB);

an antenna array attached to the PCB; and a structure attached to the PCB, the structure including a plurality of concentric rings to enclose an antenna array that is associated with an operating frequency and is fixed on the PCB, each of the plurality of concentric rings including a vertical portion that runs continuously along each of the plurality of concentric rings and that is attached to a ground plane of the PCB through a substrate of the PCB, and a planar strip attached to the vertical portion at an end that is opposite of the ground plane, wherein a height of the vertical portion and half a width of the planar strip have a combined length that is a quarter of a wavelength of the operating frequency that is associated with the antenna array, and wherein a first of the plurality of concentric rings comprises a first planar strip that is centered on a first vertical portion of the first of the plurality of concentric rings and a second of the plurality of concentric rings comprises a second planar strip that is off-centered on a second vertical portion of the second of the plurality of concentric rings, and wherein the plurality of concentric rings alternate between being centered and being off-centered as the plurality of concentric rings progress away from the antenna array.

18. An electronic device comprising a printed circuit board (PCB);

an antenna array attached to the PCB; and a structure attached to the PCB, the structure including a plurality of concentric rings to enclose an antenna array that is associated with an operating frequency and is fixed on the PCB, each of the plurality of concentric rings including a vertical portion that runs continuously along each of the plurality of concentric rings and that is attached to a ground plane of the PCB through a substrate of the PCB, and a planar strip attached to the vertical portion at an end that is opposite of the ground plane, wherein a height of the vertical portion and half a width of the planar strip have a combined length that is a quarter of a wavelength of the operating frequency that is associated with the antenna array, and wherein a first of the plurality of concentric rings comprises a first planar strip that is centered on a first vertical portion of the first of the plurality of concentric rings and a second of the plurality of concentric rings comprises a second planar strip that is off-centered on a second vertical portion of the second of the plurality of concentric rings, and wherein the plurality of concentric rings alternate between being centered and being off-centered as the plurality of concentric rings progress away from the antenna array.

* * * * *